(12) United States Patent
Bekooij et al.

(10) Patent No.: US 7,287,151 B2
(45) Date of Patent: Oct. 23, 2007

(54) COMMUNICATION PATH TO EACH PART OF DISTRIBUTED REGISTER FILE FROM FUNCTIONAL UNITS IN ADDITION TO PARTIAL COMMUNICATION NETWORK

(75) Inventors: Marco Jan Gerrit Bekooij, Eindhoven (NL); Bernardo Oliveira Kastrup Pereira, Eindhoven (NL)

(73) Assignee: NXP B.V., Eindhoven (NL)

( * ) Notice: Subject to any disclaimer, the term of this patent is extended or adjusted under 35 U.S.C. 154(b) by 108 days.

(21) Appl. No.: 10/509,562

(22) PCT Filed: Mar. 28, 2002

(86) PCT No.: PCT/IB02/00983

§ 371 (c)(1),
(2), (4) Date: Sep. 28, 2004

(87) PCT Pub. No.: WO03/083649

PCT Pub. Date: Oct. 9, 2003

(65) Prior Publication Data

US 2005/0210219 A1    Sep. 22, 2005

(51) Int. Cl.
*G06F 9/38* (2006.01)

(52) U.S. Cl. .......................... 712/225; 712/24; 711/153
(58) Field of Classification Search ...................... None
See application file for complete search history.

(56) References Cited

U.S. PATENT DOCUMENTS

| 6,629,232 | B1 * | 9/2003 | Arora et al. ................... 712/29 |
| 6,757,807 | B1 * | 6/2004 | Jacobson et al. ............. 712/23 |
| 7,020,763 | B2 * | 3/2006 | Saulsbury et al. ............ 712/24 |
| 2001/0039610 | A1 * | 11/2001 | Busa et al. ................. 712/225 |
| 2002/0120915 | A1 * | 8/2002 | Khan et al. ................. 717/100 |

* cited by examiner

*Primary Examiner*—Kenneth S. Kim
(74) *Attorney, Agent, or Firm*—Peter Zawilski

(57) ABSTRACT

A VLIW processor comprising a plurality of functional units (1, 3, 5, 7), a distributed register file (9, 11, 13, 15) accessible by the functional units (1, 3, 5, 7), a partially connected communication network (17) for coupling the functional units (1, 3, 5, 7) and selected parts of the distributed register file (9, 11, 13, 15), characterized in that the VLIW processor further comprise a communication device (29) for coupling the functional units (1, 3, 5, 7) and the distributed register file (9, 11, 13, 15).

12 Claims, 2 Drawing Sheets

COMMUNICATION PATH TO EACH PART OF DISTRIBUTED REGISTER FILE FROM FUNCTIONAL UNITS IN ADDITION TO PARTIAL COMMUNICATION NETWORK

TECHNICAL FIELD

The present invention relates to a VLIW processor comprising a plurality of functional units, a distributed register file accessible by the functional units, and a partially connected communication network for coupling the functional units and selected parts of the distributed register file.

BACKGROUND ART

A Very Long Instruction Word (VLIW) processor allows exploiting instruction-level parallelism in programs and thus executing more than one operation at a time. In one VLIW instruction, multiple and independent operations are specified. A VLIW processor uses a set of independent functional units to execute multiple operations in parallel.

Limitations of VLIW processing include limited hardware resources, limited parallelism and a large, increase in code size. Limited hardware resources may be the functional units, the central register file or the communication network. Anticipating these limitations by adding more resources has some serious drawbacks. When increasing the number of functional units, the memory size and register file bandwidth will have to increase as well. Furthermore, a large number of read and write ports are necessary for accessing the register file, imposing a bandwidth that is difficult to support without a large cost in the size of the register file and degradation in clock speed. Increasing the size of the register file may create critical timing paths and therefore limit the cycle time of the processor. Moreover, as the number of directly addressable registers increases, the number of bits to specify the multiple registers within the instructions increases as well.

The scalability of a VLIW processor can be improved by using several register files, i.e. a distributed register file, instead of a central register file. An advantage of a distributed register file is that it requires less read and write ports per register file segment, resulting in a smaller register file bandwidth. The functional units and the distributed register file are coupled by a communication network, which allows passing data produced by the functional units to the distributed register file. Usually, this communication network is partially connected, i.e. not every functional unit is coupled to every register file segment, because the use of a fully connected communication network is too expensive in terms of code size and power consumption, and also results in a decrease of the clock frequency.

In case of a VLIW processor with a distributed register file and a partially connected communication network, it can not be guaranteed that there exists a communication path from every functional unit output to every functional unit input. Therefore, it may turn out that it is not possible for some applications to be run on such a VLIW processor.

DISCLOSURE OF INVENTION

An object of the invention is to provide a VLIW processor architecture comprising a distributed register file and a partially connected communication network, in which it is possible to create a communication path between each functional unit output and each functional unit input.

This object is achieved with a VLIW processor of the kind set forth, characterized in that the VLIW processor further comprises communication means for coupling the functional units and the distributed register file.

The communication means allow transferring values from the functional unit output to the functional unit input, in case this is not possible via the partially connected communication network. In this way a communication path between each functional unit output and each functional unit input is guaranteed. If possible, communication via the partially connected communication network is preferred. The combination of a partially connected communication network and a communication means allows to derive a VLIW processor architecture having a lower communication overhead, operating at a higher clock frequency and having a better scalability when compared to a VLIW processor architecture with a fully connected communication network.

An embodiment of the invention is characterized in that the communication means comprise a multiplexer and a bus, the multiplexer being arranged for coupling the functional units and the bus, the bus being arranged for coupling the multiplexer and the distributed register file. An advantage of a bus is that the overhead in terms of silicon area is relatively low, when compared to a fully connected communication network.

An embodiment of the invention is characterized in that the communication means are arranged for communication with a first latency, i.e. the length of time it takes to write a value to a bus, to go through it and to be detected at its output, and in that the partially connected communication network is arranged for communication with a second latency, the first latency exceeding the second latency. The control logic used in the communication means will slow down the communication, in case of a large number of functional units, which will limit the clock frequency of the processor. Dividing the communication via the communication means into several sequential steps, each of which takes place in one clock cycle, can prevent this. An advantage of this embodiment is that the latency of one step in the communication can be kept low so that the communication via the communication means does not limit the clock frequency of the processor. Furthermore, a high throughput can be realized. The total latency of the communication via the communication means, being the sum of the latencies of all separate steps, will be higher than the latency of the communication via the partially connected communication network. However, the higher latency of the communication via the communication means will hardly affect the overall performance of the processor, since the majority of the communication will take place via the partially connected communication network.

An embodiment of the invention is characterized in that the bus comprises at least one pipeline register. As a result, the communication via the bus will take place in several consecutive steps, each step having a low latency. Advantages of this embodiment are that it allows achieving faster processor cycles, so increasing the clock frequency of the processor, and a higher throughput. The consequence will be an increase in the latency of the communication via the bus.

An embodiment of the invention is characterized in that the multiplexer comprises at least one register. An advantage of this embodiment is that it allows the processor running at maximal clock frequency. The consequence will be an increase in the latency of the communication via the communication means.

An embodiment of the invention is characterized in that the VLIW processor comprises a first plurality of functional units and a second plurality of functional units, a first pass unit associated with one of the functional units of the first plurality for passing data from one of the distributed register files associated with the first plurality of functional units to one of the distributed register files associated with the second plurality of functional units, and a second pass unit associated with one of the functional units of the second plurality for passing data from one of the distributed register files associated with the second plurality of functional units to one of the distributed register files associated with the first plurality of functional units. An advantage of this embodiment is that it improves the scalability of the processor. During the physical design of the processor, the communication means will impose more and more limitations on the design as the number of functional units grows. By dividing the processor architecture into at least two pluralities of functional units, the dimension and the corresponding overhead of the communication means of each plurality of functional units can be controlled.

An embodiment of the invention is characterized in that the pass unit is part of the associated functional unit. An advantage of this embodiment is that no separate pass unit is required, saving silicon area and communication connections.

An embodiment of the invention is characterized in that the communication means couple the functional units and all parts of the distributed register file. An advantage of this embodiment is that the functional unit outputs and all parts of the distributed register file are coupled, increasing the flexibility of the processor.

BRIEF DESCRIPTION OF THE DRAWINGS

The features of the described embodiments will be further elucidated and described with reference to the drawings.

DESCRIPTION OF PREFERRED EMBODIMENTS

Figure 1:
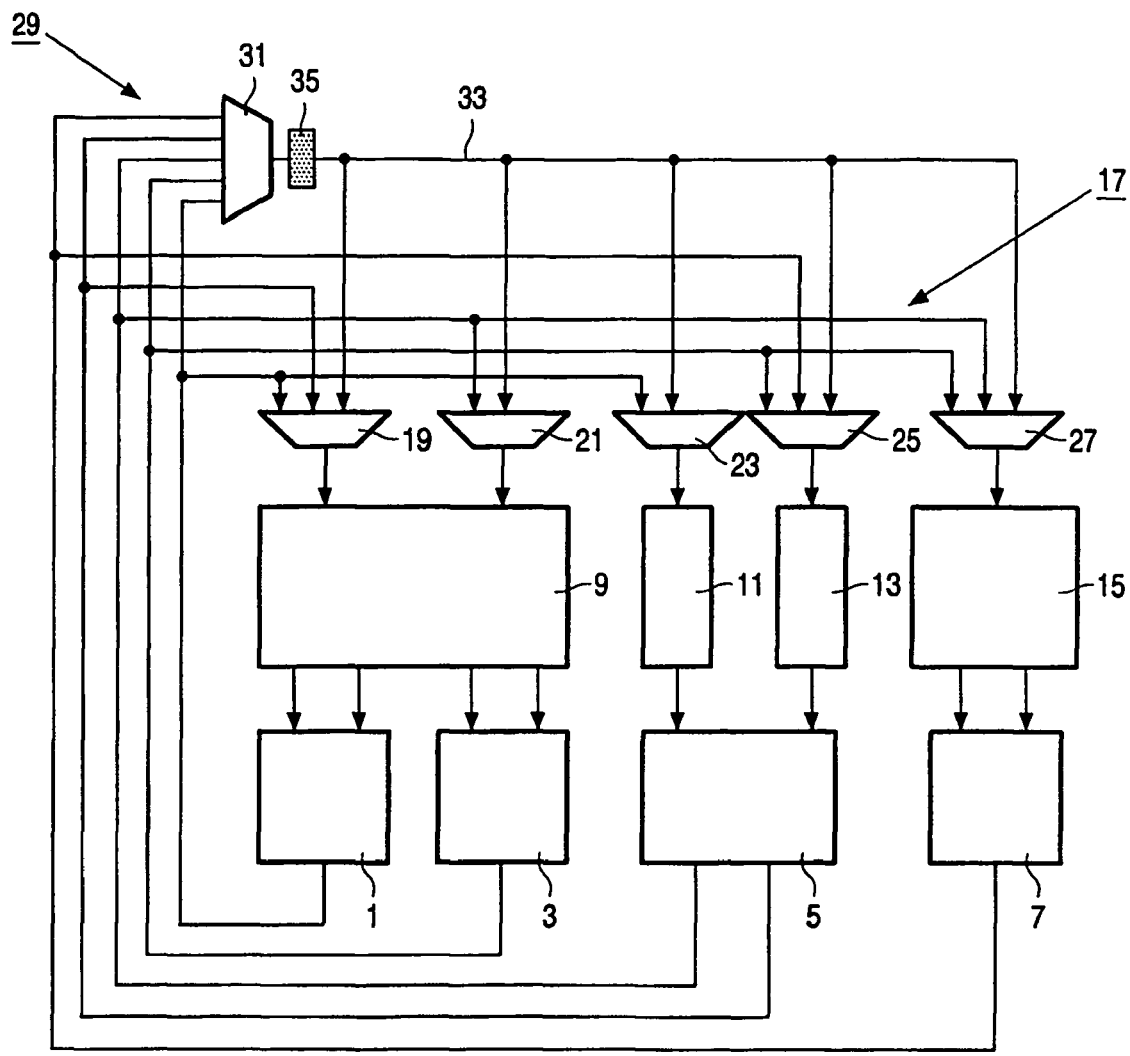
FIG. 1 is a schematic diagram of a VLIW processor comprising one plurality of functional units, in accordance with an embodiment of the present invention.

Referring to FIG. 1, a schematic block diagram illustrates a VLIW processor comprising a plurality of functional units 1, 3, 5 and 7. The processor has a distributed register file including the register file segments 9, 11, 13 and 15. The functional units 1 and 3 can read from the register file segment 9, the functional unit 5 can read from the register file segments 11 and 13, and the functional unit 7 can read from the register file segment 15.

The processor includes a partially connected communication network 17 for coupling the functional units 1, 3, 5 and 7, and selected distributed register file segments 9, 11, 13 and 15. The partially connected communication network 17 comprises the multiplexers 19, 21, 23, 25 and 27.

Furthermore, the processor comprises a communication device 29 for coupling the functional units 1, 3, 5 and 7, and all distributed register file segments 9, 11, 13 and 15. The communication device 29 comprises the multiplexers 19, 21, 23, 25 and 27.

The communication device 29 allows transferring values from the functional units 1, 3, 5 and 7 to the distributed register file segments 9, 11, 13 and 15, in case this is not possible via the partially connected communication network 17. In this way a communication path between each output of the functional units 1, 3, 5 and 7, and each input of the functional units 1, 3, 5 and 7 is guaranteed to exist. For instance, functional unit 1 is not coupled to register file segment 15 via the partially connected communication network 17, but only via the communication device 29. If possible, communication via the partially connected communication network 17 is preferred.

Preferably, the communication device 29 is arranged for communication with a first latency, the partially connected communication network 17 is arranged for communication with a second latency, the first latency exceeding the second latency. An advantage of this embodiment is that it prevents the communication via the communication device 29 from being the rate-limiting step, so that it allows the processor to run at maximal clock frequency. Furthermore a high throughput is realized. Usually, the communication device 29 comprises a form of shared communication mechanism. Therefore, the communication via the communication device 29 may be slow down by its control logic, especially in case of a large number of functional units. Dividing the communication via the communication device into several sequential steps, each of which takes place in one clock cycle, keeps the latency of one communication step low. This prevents the communication via the communication device to limit the clock frequency of the processor. The total latency of the communication via the communication device, being the sum of the latencies of all separate steps, will be higher than the latency of the communication via the partially connected communication network. However, the higher latency of the communication via the communication device will hardly affect the overall performance of the processor, since the majority of the communication will take place via the partially connected communication network. In an advantageous embodiment, the communication device 29 comprises a multiplexer 31 and a global bus 33, the multiplexer being arranged for coupling the functional units 1, 3, 5 and 7, and the global bus 33, the global bus 33 being arranged for coupling the multiplexer 31 and all distributed register file segments 9, 11, 13 and 15. The global bus 33 differs from the partially connected communication network 17 in that multiple functional units 1, 3, 5 and 7 are coupled to the global bus 33 and these functional units time-multiplex the global bus, whereas the partially connected communication network 17 couples one functional unit to a register file segment. An advantage of a global bus is that the overhead in terms of silicon area is relatively low when compared to a fully connected communication network.

Preferably, the global bus 33 comprises a pipeline register 35. As a result, the communication via the global bus 33 will take in several consecutive steps, each step having a low latency. Advantages of this embodiment are that is allows faster processor cycles, so increasing the clock frequency of the processor, and a higher throughput. The consequence will be an increase in the latency of the communication via the global bus 33 compared to the communication via the partially connected communication network 17. In some embodiments, the multiplexer 31 comprises a register. An advantage of this embodiment is that it also allows the processor running at maximal clock frequency. The consequence will be an increase in the latency of the communication via the communication device as well.

The functional units can be coupled to one register file segment, as in case of the functional unit 7, or to multiple register file segments, as in case of the functional unit 5, or multiple functional units may be coupled to one register file segment, as in case of the functional units 1 and 3. The register file segments can be coupled to one functional unit, as in case of register file segment 15, or to multiple functional units, as in case of register file segment 9. The degree of coupling between the register file segments and the functional units can depend of the type of operations that the functional unit has to perform.

In the embodiment shown in FIG. 1, the partially connected communication network 17 and the communication device 29 share some resources. In some embodiments even more resources may be shared, or no resources are shared.

Figure 2:
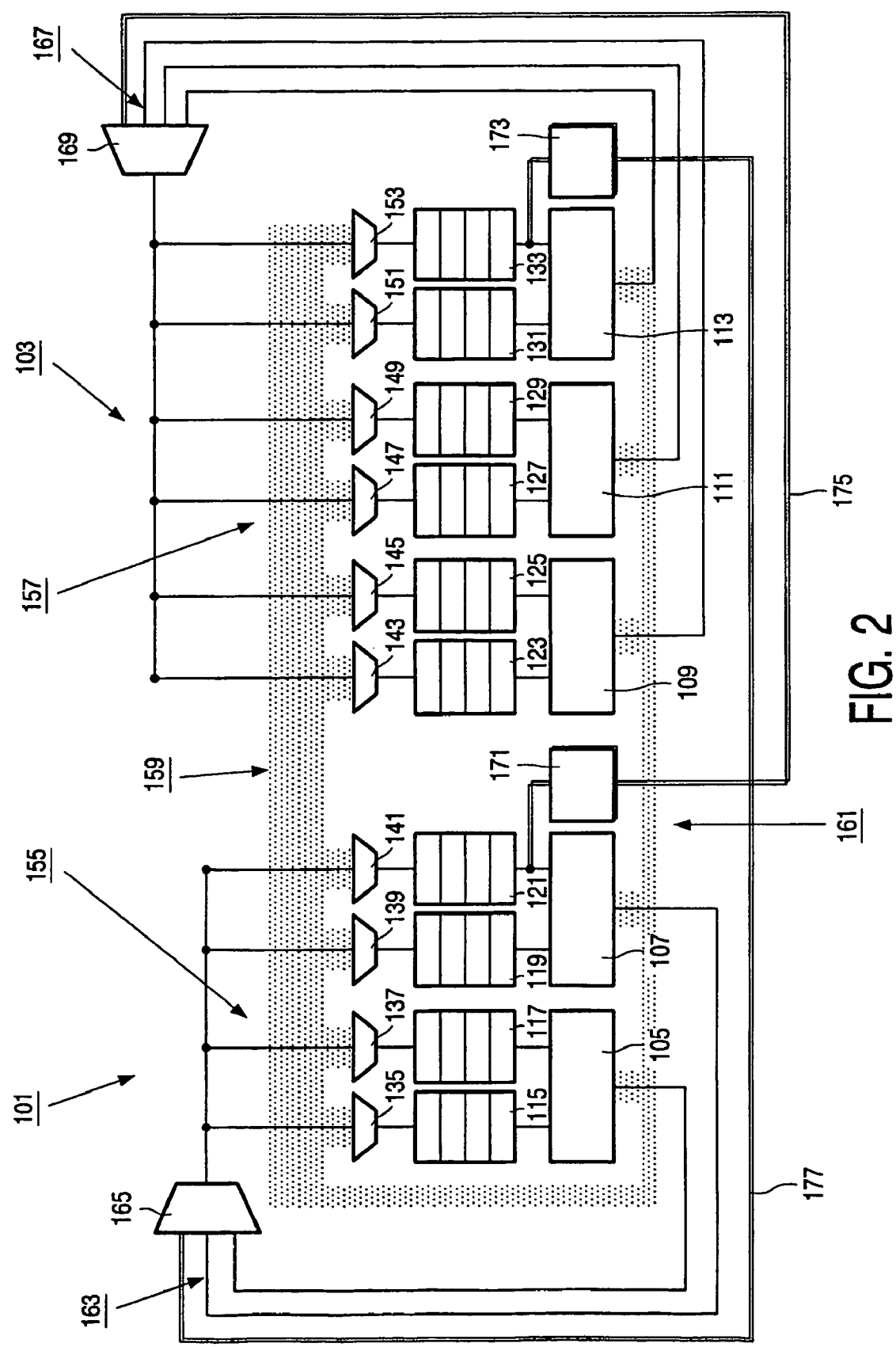
FIG. 2 is a schematic diagram of a VLIW processor comprising two pluralities of functional units, in accordance with an embodiment of the present invention.

Referring to FIG. 2, a schematic block diagram illustrates a VLIW processor comprising a first plurality of functional units 101 comprising functional units 105 and 107. The processor further comprises a second plurality of functional units 103 comprising functional units 109, 111 and 113. The processor has a distributed register file including register file segments 115, 117, 119 and 121 for the first plurality of functional units 101 and register file segments 123, 125, 127, 129, 131 and 133 for the second plurality of functional units 103. Functional unit 105 can read from register file segments 115 and 117, functional unit 107 can read from register file segments 119 and 121, functional unit 109 can read from register file segments 123 and 125, functional unit 111 can read from register file segments 127 and 129 and functional unit 113 can read from register file segments 131 and 133.

The processor comprises a first partially connected communication network 155 of the first plurality of functional units 101, comprising multiplexers 135, 137, 139 and 141, and a second partially connected communication network 157 of the second plurality of functional units 103, comprising multiplexers 143, 145, 147, 149, 151 and 153. In the described embodiment, the partially connected communication networks 155 and 157 are coupled, for coupling the functional units 105, 107, 109, 111 and 113, and selected segments of the distributed register file 115, 117, 119, 121, 123, 125, 127, 129, 131 and 133. This coupling is symbolized by connections 159 and 161.

Furthermore, the first plurality of functional units 101 comprises a first communication device 163 for coupling the functional units 105 and 107, and all distributed register file segments 115, 117, 119 and 121. The first communication device 163 comprises multiplexers 135, 137, 139, 141 and 165. The second plurality of functional units 103 comprises a second communication device 167 for coupling the functional units 109, 111 and 113, and all distributed register file segments 123, 125, 127, 129, 131 and 133. The second communication device 167 comprises multiplexers 143, 145, 147, 149, 151, 153 and 169. An advantage of this embodiment is that it improves the scalability of the processor. As the number of functional units grows, the communication device will impose more and more limitations on the physical design of the processor. By dividing the processor architecture into at least two pluralities of functional units, the dimension and the corresponding overhead of the communication device of each plurality of functional units can be controlled.

In an advantageous embodiment the first plurality of function units 101 comprises a first pass unit 171, associated with functional unit 107. The first pass unit 171 can read data from register file segment 121, and the first pass unit 171 and the second communication device 167 are coupled via connection 175. The second plurality of functional units 103 comprises a second pass unit 173, associated with functional unit 113. The second pass unit 173 can read data from the register file segment 133, and the second pass unit 173 and the first communication device 163 are coupled via connection 177. The first pass unit 171 allows passing data from the register file segment 121 to the second communication device 167. The second pass unit 173 allows passing data from the register file segment 133 to the first communication device 163. An advantage of this embodiment is that it is always possible to pass a value from the output of any functional unit of the first plurality of functional units 101 to the input of any functional unit of the second plurality of functional units 103, and from the output of any functional unit of the second plurality of functional units 103 to the input of any functional unit of the first plurality of functional units 101. For example, in case a value can not be passed from the output of a functional unit of the first plurality of functional units 101 to the input of a functional unit of the second plurality of functional units 103, via the coupled partially connected communication networks 155 and 157, this value can be passed from the output of functional units 105 and 107 to the register file segment 121, via the first communication device 163. Subsequently, the first pass unit 171 can pass the value to the second communication device 167. The value is further passed to the input of a functional unit of the second plurality of functional units 103, via the multiplexers 143, 145, 147, 149, 151 and 153 and the distributed register file segments 123, 125, 127, 129, 131 and 133. Communication between the functional units of different pluralities of functional units preferably takes place via the coupled partially connected communication networks 155 and 157, since the output of a functional unit and a register file segment are usually directly coupled via the partially connected communication network and the multiplexers. However, if this is not possible, the pass units allow communication between functional units associated with different pluralities of functional units. In case of communication between the functional units of different pluralities of functional units via the pass unit and the communication device, more communication steps are involved, increasing the communication time.

In some embodiments the pass units 171 and 173 are coupled to respectively the partially connected communication network 155 and 157. The first pass unit 171 is able to pass a value to a register file segment of the second plurality of functional units 103 and the second pass unit 173 is able to pass a value to a register file segment of the first plurality of functional units 101. For instance, the first pass unit 171 is able to pass a value to a register file segment of the second plurality of functional units 103, via the first partially connected communication network 155, the connection 159 and the second partially connected communication network 157. In case the first pass unit 171 is not able to pass a value to a specific register file segment of the second plurality of functional units 103 because there is no coupling via the coupled partially connected communication networks 155 and 157, the value can be passed to a register file segment of the second plurality of functional units 103 which is coupled to the first pass unit 171 via the coupled partially connected communication networks 155 and 157. Subsequently, the functional unit of the second plurality of functional units 103, associated with the register file segment to which the value is passed, can pass the value to the intended register file segment of the second plurality of functional units 103, via the partially connected communication network 157. An advantage of this embodiment is that saves silicon area since the connections 175 and 177 can be omitted. The communication overhead may be larger, but is acceptable if it is expected that passing values via the pass units 171 and 173 will not occur very often.

In some embodiments the pass units 171 and 173 are coupled to respectively the partially connected communication networks 155 and 157. The first pass unit 171 is able to pass a value to the second communication device 167 and the second pass unit 173 is able to pass a value to the first communication device 163. For instance, the first pass unit 171 can pass a value to a register file segment 123, 125, 127, 129, 131 and 133, associated with the second plurality of functional units 103, via the first partially connected communication network 155, the connection 159 and the second partially connected communication network 157 Subsequently a functional unit 109, 111 and 113, associated with the second plurality of functional units 103, and associated with the register file segment to which the value is passed, can pass the value to the second communication device 167. Finally, the value is further passed to the input of the intended functional unit of the second plurality of functional units 103. An advantage of this embodiment is that saves silicon area since the connections 175 and 177 can be omitted. The communication overhead may be larger, but is acceptable if it is expected that passing values via the pass units 171 and 173 will not occur very often.

In the embodiment described in FIG. 2, the pass units 171 and 173 are separate units associated with functional units 107 and 113. In some embodiments, the pass unit can be a part of the associated functional unit by adding an additional operation to this functional unit that allows passing a value from a register file segment.

The functional units can be coupled to two register file segments, as in case of the functional units 105, 107, 109, 111 and 113. The register file segments can be coupled to one functional unit or to multiple functional units. The degree of coupling between the register file segments and the functional units can depend of the type of operations that the functional unit has to perform.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. VLIW processor comprising:
a plurality of functional units;
a distributed register file accessible by the functional units;
a partially connected communication network that transfers values from the functional units to selected parts of the distributed register file; and
communication means for selecting a subset of the functional units and coupling the subset of the functional units to each part of the distributed register file, and for transferring values from the subset of the functional units to each part of the distributed register file.

2. A VLIW processor according to claim 1 wherein:
the communication means comprise a multiplexer and a bus, the multiplexer being arranged for coupling the functional units and the bus, the bus being arranged for coupling the multiplexer and the distributed register file.

3. A VLIW processor according to claim 1 wherein:
the communication means are arranged for communication with a first latency, the partially connected communication network is arranged for communication with a second latency, the first latency exceeding the second latency.

4. A VLIW processor according to claim 2 wherein: the bus comprises at least one pipeline register.

5. A VLIW processor according to claim 2 wherein:
the multiplexer comprises at least one register.

6. A VLIW processor according to claim 1, further comprising a first plurality of functional units and a second plurality of functional units;
a first pass unit associated with one of the functional units of the first plurality for passing data from one of the distributed register files associated with the first plurality of functional units to one of the distributed register files associated with the second plurality of functional units;
and a second pass unit associated with one of the functional units of the second plurality for passing data from one of the distributed register files associated with the second plurality of functional units to one of the distributed register files associated with the first plurality of functional units.

7. A VLIW processor according to claim 6 wherein:
the pass units are part of the respectively associated functional units.

8. A VLIW processor according to claim 1 wherein:
the communication means couple the functional units and all parts of the distributed register file.

9. A VLIW processor comprising:
a plurality of functional units;
a distributed register file including a plurality of register file segments accessible by the functional units;
a partially connected communication network that transfers values from the functional units to the plurality of register file segments; and
a communication device that selects a subset of the functional units and couples the subset of the functional units to each of the plurality of register file segments, and that transfers values from the subset of the functional units to each of the plurality of register file segments.

10. The VLIW processor of claim 9, wherein the values are transferred from the subset of the functional units to each of the plurality of register file segments via the communication device when the values are unable to be transferred from the subset of the functional units to each of the plurality of register file segments via the partially connected communication network.

11. For use in a VLIW processor having a partially connected communication network that transfers values from a plurality of functional units to a plurality of register file segments, a method for transferring values from the plurality of functional units to a distributed register file, the distributed register file including the plurality of register file segments that are accessible by the functional units, the method comprising:
selecting a subset of the plurality of functional units;
coupling the subset of the plurality of functional units to each of the plurality of register file segments; and
transferring values from the subset of the plurality of functional units to each of the plurality of register file segments.

12. The method of claim 11, further comprising determining that values are unable to be transferred from the subset of the plurality of functional units to each of the plurality of register file segments via the partially connected communication network, and in response thereto transferring values from the subset of the plurality of functional units to each of the plurality of register file segments.

* * * * *